United States Patent
Takahashi et al.

(10) Patent No.: US 12,557,088 B2
(45) Date of Patent: Feb. 17, 2026

(54) BASE STATION AND USER EQUIPMENT

(71) Applicants: DENSO CORPORATION, Kariya (JP); TOYOTA JIDOSHA KABUSHIKI KAISHA, Toyota (JP)

(72) Inventors: Hideaki Takahashi, Kariya (JP); Masayuki Hoshino, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 331 days.

(21) Appl. No.: 18/314,715

(22) Filed: May 9, 2023

(65) Prior Publication Data

US 2023/0276419 A1    Aug. 31, 2023

Related U.S. Application Data

(63) Continuation of application No. PCT/JP2021/034910, filed on Sep. 22, 2021.

(30) Foreign Application Priority Data

Nov. 10, 2020 (JP) ................. 2020-187345

(51) Int. Cl.
*H04W 72/0457* (2023.01)
*H04W 72/51* (2023.01)

(52) U.S. Cl.
CPC ....... *H04W 72/0457* (2023.01); *H04W 72/51* (2023.01)

(58) Field of Classification Search
CPC ........................... H04W 72/0457; H04W 72/51
See application file for complete search history.

(56) References Cited

U.S. PATENT DOCUMENTS

| | | | | |
|---|---|---|---|---|
| 2018/0098358 | A1* | 4/2018 | Rico Alvarino | H04W 52/34 |
| 2019/0052328 | A1* | 2/2019 | Akula | H04L 5/006 |
| 2019/0132092 | A1* | 5/2019 | Chen | H04W 72/23 |
| 2019/0140881 | A1* | 5/2019 | Akkarakaran | H04L 27/2657 |
| 2019/0158250 | A1* | 5/2019 | Ang | H04L 5/0055 |

(Continued)

FOREIGN PATENT DOCUMENTS

| | | | |
|---|---|---|---|
| CN | 111567126 A | 8/2020 | |
| CN | 111869268 A | 10/2020 | |

(Continued)

OTHER PUBLICATIONS

Xinggin Lin et al., "A Primer on Bandwidth Parts in 5G New Radio," pp. 1-7.

(Continued)

*Primary Examiner* — Ajay Cattungal
(74) *Attorney, Agent, or Firm* — Harness, Dickey & Pierce, P.L.C.

(57) ABSTRACT

A base station according to an aspect of the present disclosure includes a memory storing a program, and one or more processors configured to execute the program to obtain a System Information Block 1, SIB1, and transmit the SIB1. The SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

12 Claims, 6 Drawing Sheets

(56) References Cited

U.S. PATENT DOCUMENTS

| | | | |
|---|---|---|---|
| 2020/0068639 A1* | 2/2020 | Kim | H04W 76/16 |
| 2020/0092799 A1* | 3/2020 | Xu | H04W 74/006 |
| 2020/0220608 A1* | 7/2020 | Venugopal | H04B 7/06964 |
| 2020/0245391 A1* | 7/2020 | Yamamoto | H04W 76/34 |
| 2022/0394638 A1* | 12/2022 | Yang | H04W 56/001 |
| 2023/0164669 A1 | 5/2023 | Liu | |
| 2024/0008050 A1* | 1/2024 | Zhou | H04W 72/231 |

FOREIGN PATENT DOCUMENTS

| | | |
|---|---|---|
| CN | 111885674 A | 11/2020 |
| JP | 2022076780 A | 5/2022 |
| JP | 2022077435 A | 5/2022 |

OTHER PUBLICATIONS

U.S. Appl. No. 18/314,690, filed May 9, 2023, Takahashi et al.
U.S. Appl. No. 18/314,731, filed May 9, 2023, Takahashi et al.
International Search Report regarding International Patent Application No. PCT/JP2021/034910, dated Dec. 28, 2021.
3GPP TS 38.331 V16.2.0 (Sep. 2020) "3rd Generation Partnership Project; Technical Specification Group Radio Access Network; NR; Radio Resource Control (RRC) protocol specification (Release 16)".
3GPP TSG RAN Meeting #89e, Electronic Meeting, Sep. 14-18, 2020, RP-201677, Ericsson, "Revised SID on Study on support of reduced capability NR devices".
3GPP TSG RAN WG1 Meeting #102e, E-meeting, Aug. 17-28, 2020, R1-2005830, Lenovo, Motorola Mobility, "On UE complexity reduction features for RedCap".
3GPP TSG RAN WG1 #103-e, e-Meeting, Oct. 26-Nov. 13, 2020, R1-2007715, ZTE, "Potential UE complexity reduction features".
3GPP TSG RAN WG1 #103-e, e-Meeting, Oct. 26-Nov. 13, 2020, R1-2008857, Xiaomi, Discussion on the complexity reduction for reduced capability device, pp. 1-9.
3GPP TSG-RAN WG2 Meeting #111-e, Online, Aug. 17-28, 2020, R2-2008192, Huawei, "Summary of offline 110—Identification and access restriction", pp. 1-19.

* cited by examiner

BASE STATION AND USER EQUIPMENT

CROSS-REFERENCE TO RELATED APPLICATIONS

This application is based on and claims the benefit of priority from Japanese Patent Application No. 2020-187345, filed on Nov. 10, 2020, the entire content of which is incorporated herein by reference.

BACKGROUND

1. Technical Field

The present disclosure relates to a base station and a user equipment.

2. Related Art

Mobile communication technologies have been proposed and standardized as Technical Specifications (TSs) in 3rd Generation Partnership Project (3GPP). Currently in particular, 5th Generation (5G) technologies have been proposed and standardized.

SUMMARY

A base station according to an aspect of the present disclosure includes a memory storing a program, and one or more processors configured to execute the program to obtain a System Information Block 1, SIB1, and transmit the SIB1. The SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

A user equipment according to an aspect of the present disclosure includes a memory storing a program, and one or more processors configured to execute the program to receive a System Information Block 1, SIB1, that includes a first parameter indicating a location and a bandwidth of a first initial downlink Bandwidth Part, BWP, and a second parameter indicating a location and a bandwidth of a second initial downlink BWP for a user equipment with a limited bandwidth capability, and obtain the first parameter or the second parameter included in the SIB1.

DETAILED DESCRIPTION OF THE PREFERRED EMBODIMENTS

Figure 1:
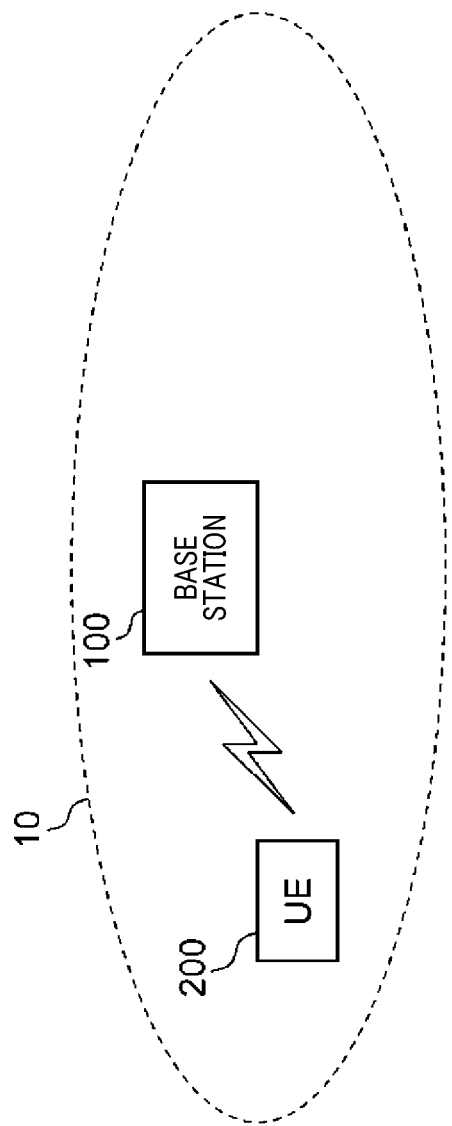
FIG. 1 is an explanatory diagram illustrating an example of a schematic configuration of a system according to embodiments of the present disclosure.

For example, as described in 3GPP TS 38.331 V16.2.0 (2020-09), a base station broadcasts System Information, and User Equipments (UEs) receive the System Information. The System Information includes a Master Information Block (MIB), a System Information Block 1 (SIB1), and other SIBs.

Further, as described in RP-201677, UEs with reduced capabilities are being studied. For example, study on UE complexity reduction such as reduction in the number of antennas and reduction in bandwidth has begun.

According to the technology disclosed in 3GPP TS 38.331 V16.2.0 (2020-09), the SIB1 includes a parameter set (that is, genericParameters) for an initial Bandwidth Part (BWP). The parameter set includes, in particular, a parameter indicating a location and a bandwidth of the initial Bandwidth Part (that is, locationAndBandwidth). However, a detailed study by the inventors has revealed an issue that, since the parameter is a common parameter for all UEs, the bandwidth of the initial BWP will be unsuitable for a UE that supports a narrow bandwidth as described in RP-201677.

An object of the present disclosure is to provide a base station and a user equipment that make it possible to use an initial Bandwidth Part with a bandwidth suitable for the user equipment.

A base station according to an aspect of the present disclosure includes an information obtaining unit configured to obtain a System Information Block 1, SIB1, and a communication processing unit configured to transmit the SIB1. The SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

A user equipment according to an aspect of the present disclosure includes a communication processing unit configured to receive a System Information Block 1, SIB1, that includes a first parameter indicating a location and a bandwidth of a first initial downlink Bandwidth Part, BWP, and a second parameter indicating a location and a bandwidth of a second initial downlink BWP for a user equipment with a limited bandwidth capability, and an information obtaining unit configured to obtain the first parameter or the second parameter included in the SIB1.

A base station according to an aspect of the present disclosure includes an information obtaining unit configured to obtain a Radio Resource Control, RRC, message that includes identification information for identifying an initial downlink Bandwidth Part, BWP, for a user equipment with a limited bandwidth capability, and a communication processing unit configured to transmit the RRC message to a user equipment.

A user equipment according to an aspect of the present disclosure includes a communication processing unit configured to receive, from a base station, an RRC message that includes identification information for identifying an initial downlink Bandwidth Part, BWP, for a user equipment with a limited bandwidth capability, and an information obtaining unit configured to obtain the identification information included in the RRC message.

The present disclosure makes it possible to use an initial Bandwidth Part with a bandwidth suitable for a user equipment. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:
1. Configuration of System
2. Configuration of Base Station
3. Configuration of User Equipment
4. First Embodiment
5. Second Embodiment
6. Modification Examples

1. Configuration of System

A configuration example of a system 1 according to embodiments of the present disclosure will be described with reference to FIG. 1. Referring to FIG. 1, the system 1 includes a base station 100 and a user equipment (UE) 200.

For example, the system 1 is a system compliant with Technical Specifications (TSs) of 3GPP. More specifically, for example, the system 1 is a system compliant with 5G or New Radio (NR) TSs. Naturally, the system 1 is not limited to this example.

(1) Base Station 100

The base station 100 is a node in a Radio Access Network (RAN) and communicates with a UE (for example, UE 200) located within a coverage area 10 of the base station 100.

For example, the base station 100 communicates with a UE (for example, UE 200) using a RAN protocol stack. For example, the protocol stack includes a Radio Resource Control (RRC) layer, a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Alternatively, the protocol stack may include some, but not all, of these layers.

For example, the base station 100 is a gNB. The gNB is a node that provides NR user plane and control plane protocol terminations towards a UE and is connected to the 5G Core Network (5GC) via an NG interface. Alternatively, the base station 100 may be an en-gNB.

The base station 100 may include a plurality of nodes. The plurality of nodes may include a first node that hosts higher layers included in the protocol stack, and a second node that hosts lower layers included in the protocol stack. The higher layers may include the RRC layer, the SDAP layer, and the PDCP layer, while the lower layers may include the RLC layer, the MAC layer, and the PHY layer. The first node may be a Central Unit (CU), and the second node may be a Distributed Unit (DU). Note that the plurality of nodes may include a third node that performs lower processing of the PHY layer, and the second node may perform higher processing of the PHY layer. The third node may be a Radio Unit (RU).

Alternatively, the base station 100 may be one of the plurality of nodes, and may be connected to another unit of the plurality of nodes.

The base station 100 may be an Integrated Access and Backhaul (IAB) donor or an IAB node.

(2) UE 200

The UE 200 communicates with a base station. For example, the UE 200 communicates with the base station 100 when being located within the coverage area 10 of the base station 100.

For example, the UE 200 communicates with a base station (for example, base station 100) using the protocol stack.

2. Configuration of Base Station

Figure 2:
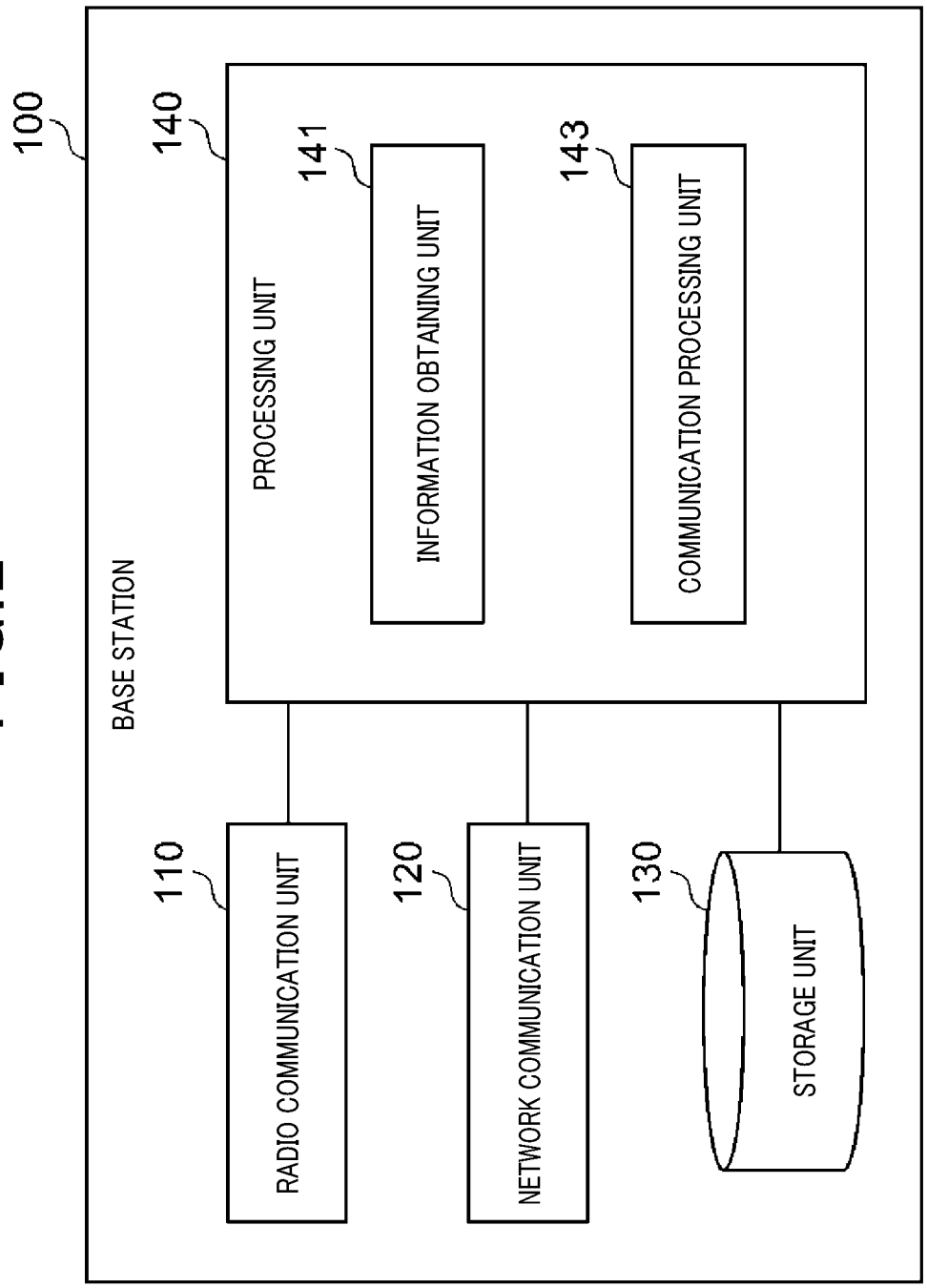
FIG. 2 is a block diagram illustrating an example of a schematic functional configuration of a base station according to embodiments of the present disclosure.
Figure 3:
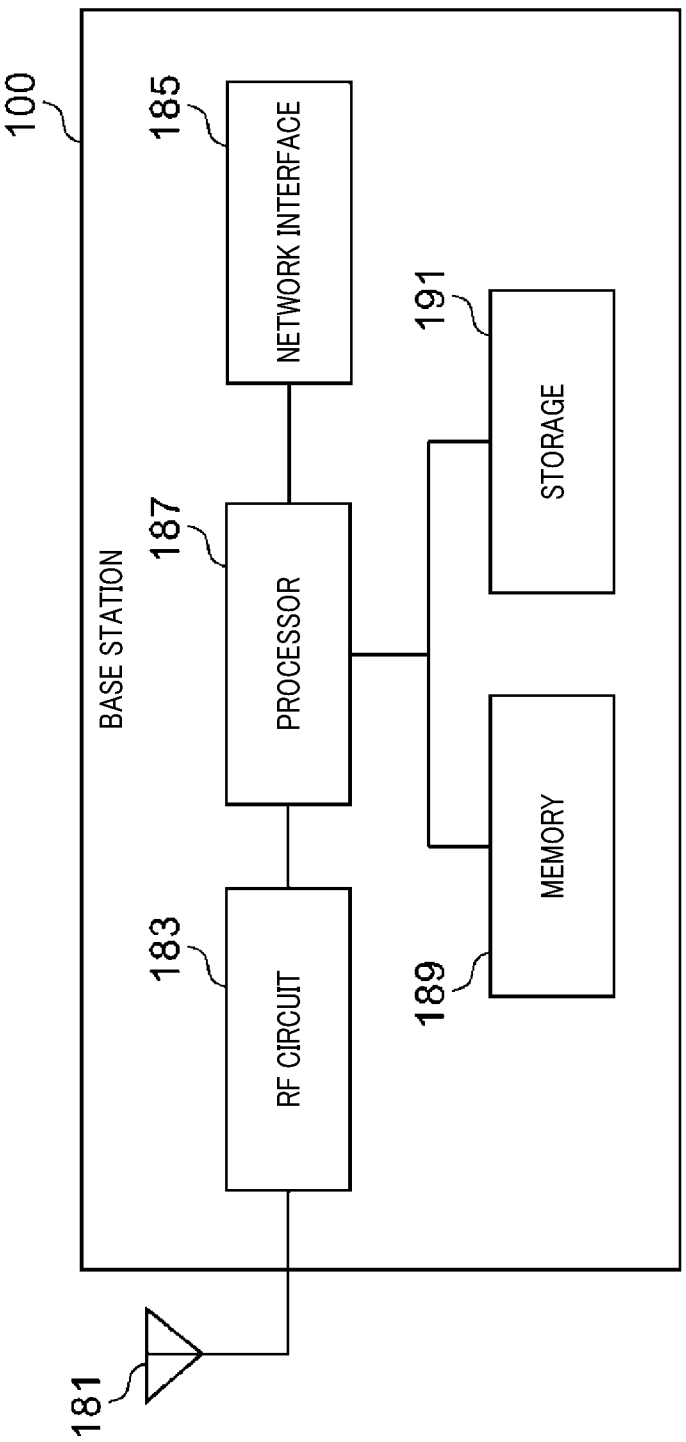
FIG. 3 is a block diagram illustrating an example of a schematic hardware configuration of the base station according to embodiments of the present disclosure.

A configuration example of the base station 100 according to embodiments of the present disclosure will be described with reference to FIGS. 2 and 3.

(1) Functional Configuration

First, a functional configuration example of the base station 100 according to embodiments of the present disclosure will be described with reference to FIG. 2. Referring to FIG. 2, the base station 100 includes a radio communication unit 110, a network communication unit 120, a storage unit 130, and a processing unit 140.

The radio communication unit 110 wirelessly transmits and receives signals. For example, the radio communication unit 110 receives signals from and transmits signals to a UE.

The network communication unit 120 receives signals from and transmits signals to the network.

The storage unit 130 stores various information.

The processing unit 140 provides various functions of the base station 100. The processing unit 140 includes an information obtaining unit 141 and a communication processing unit 143. Note that the processing unit 140 may further include a component other than these components. That is, the processing unit 140 may also perform an operation other than operations of these components. Specific operations of the information obtaining unit 141 and the communication processing unit 143 will be described in detail later.

For example, the processing unit 140 (communication processing unit 143) communicates with a UE (for example, UE 200) via the radio communication unit 110. For example, the processing unit 140 communicates with other nodes (for example, nodes within the core network or other base stations) via the network communication unit 120.

(2) Hardware Configuration

Next, a hardware configuration example of the base station 100 according to embodiments of the present disclosure will be described with reference to FIG. 3. Referring to FIG. 3, the base station 100 includes an antenna 181, an RF circuit 183, a network interface 185, a processor 187, a memory 189, and a storage 191.

The antenna 181 converts signals into radio waves, and emits the radio waves into the air. In addition, the antenna 181 receives radio waves in the air, and converts the radio waves into signals. The antenna 181 may include a transmitting antenna and a receiving antenna, or may be a single antenna for transmission and reception. The antenna 181 may be a directional antenna, and may include a plurality of antenna elements.

The RF circuit 183 performs analog processing on signals that are transmitted and received through the antenna 181. The RF circuit 183 may include a high-frequency filter, an amplifier, a modulator, a lowpass filter, and the like.

The network interface 185 is, for example, a network adaptor, and transmits signals to and receives signals from the network.

The processor 187 performs digital processing on signals that are transmitted and received through the antenna 181 and the RF circuit 183. The digital processing includes processing of the RAN protocol stack. The processor 187 also performs processing on signals that are transmitted and received through the network interface 185. The processor 187 may include a plurality of processors, or may be a single processor. The plurality of processors may include a baseband processor that performs the digital processing and one or more processors that perform other processing.

The memory 189 stores a program executed by the processor 187, parameters related to the program, and data related to the program. The memory 189 may include at least one of a Read Only Memory (ROM), an Erasable Programmable Read Only Memory (EPROM), an Electrically Erasable Programmable Read Only Memory (EEPROM), a Random Access Memory (RAM), and a flash memory. All or part of the memory 189 may be included in the processor 187.

The storage 191 stores various information. The storage 191 may include at least one of a Solid State Drive (SSD) and a Hard Disc Drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

A part or all of the processing unit 140 may be virtualized. In other words, a part or all of the processing unit 140 may be implemented as a virtual machine. In this case, a part or all of the processing unit 140 may operate as a virtual machine on a physical machine including a processor, a memory, and the like (that is, hardware) and a hypervisor.

Given the hardware configuration described above, the base station 100 may include a memory (that is, memory 189) that stores a program and one or more processors (that is, processor 187) capable of executing the program, and the one or more processors may be configured to execute the program to perform operations of the processing unit 140. The program may be a program for causing the processors to execute the operations of the processing unit 140.

3. Configuration of User Equipment

Figure 4:
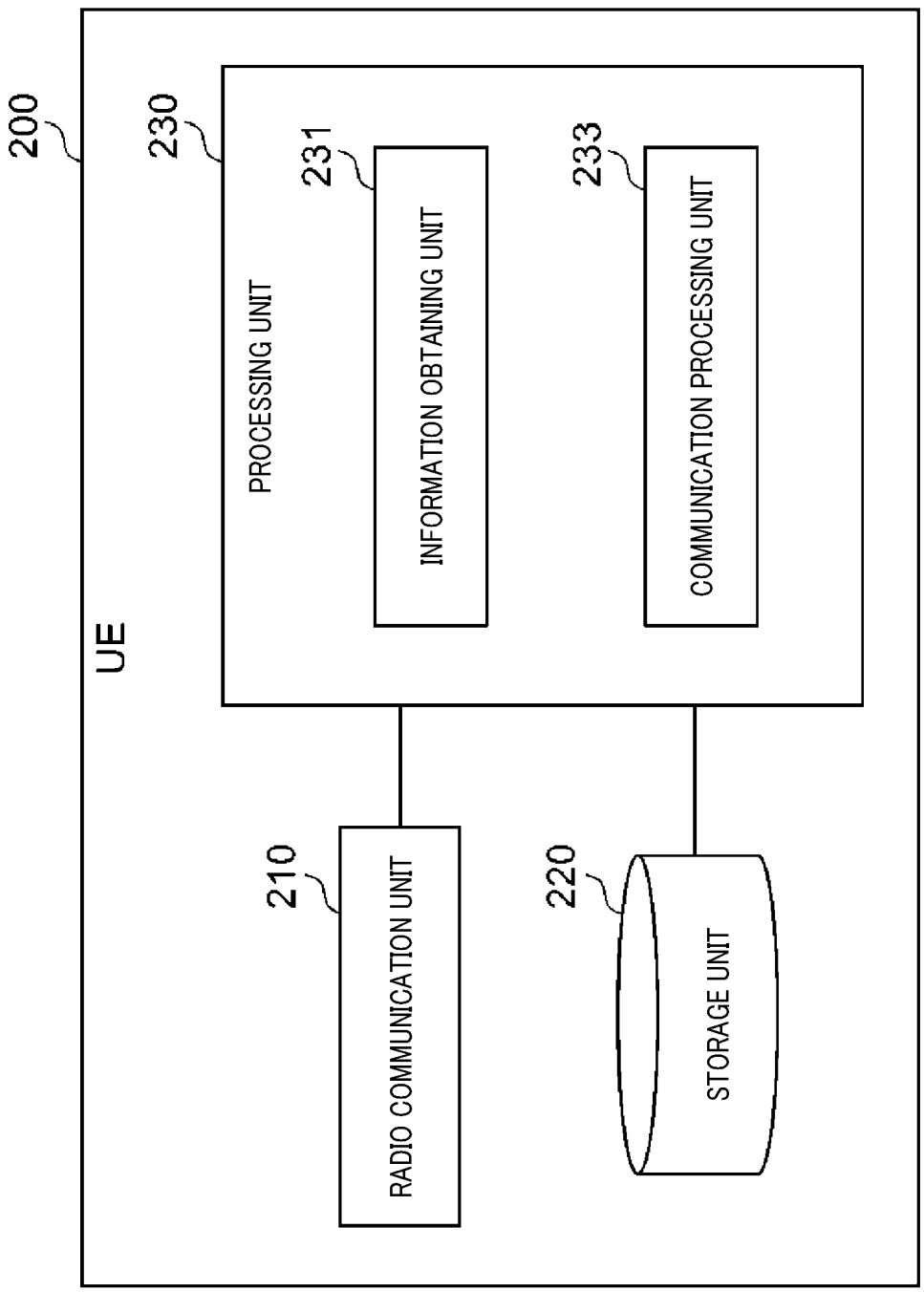
FIG. 4 is a block diagram illustrating an example of a schematic functional configuration of a user equipment according to embodiments of the present disclosure.
Figure 5:
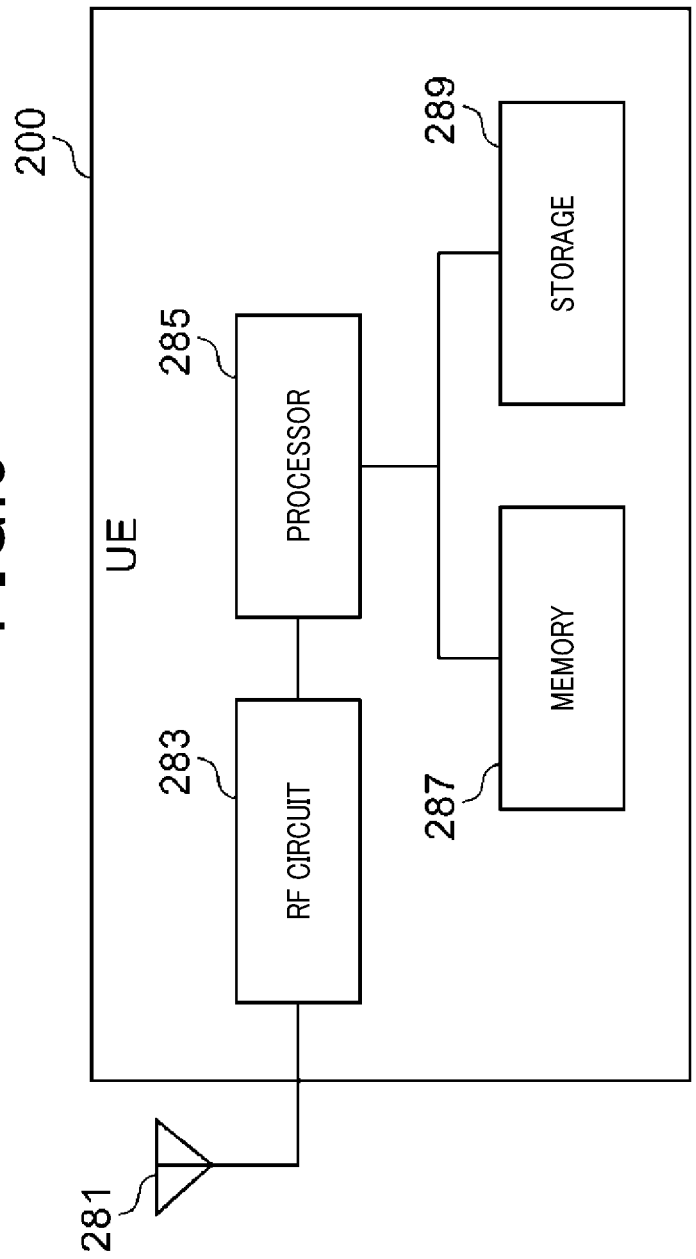
FIG. 5 is a block diagram illustrating an example of a schematic hardware configuration of the user equipment according to embodiments of the present disclosure.

A configuration example of the UE 200 according to embodiments of the present disclosure will be described with reference to FIGS. 4 and 5.
(1) Functional Configuration First, a functional configuration example of the UE 200 according to embodiments of the present disclosure will be described with reference to FIG. 4. Referring to FIG. 4, the UE 200 includes a radio communication unit 210, a storage unit 220, and a processing unit 230.

The radio communication unit 210 wirelessly transmits and receives signals. For example, the radio communication unit 210 receives signals from and transmits signals to a base station. For example, the radio communication unit 210 receives signals from and transmits signals to another UE.

The storage unit 220 stores various information.

The processing unit 230 provides various functions of the UE 200. The processing unit 230 includes an information obtaining unit 231 and a communication processing unit 233. Note that the processing unit 230 may further include a component other than these components. That is, the processing unit 230 may also perform an operation other than operations of these components. Specific operations of the information obtaining unit 231 and the communication processing unit 233 will be described in detail later.

For example, the processing unit 230 (communication processing unit 233) communicates via the radio communication unit 210 with a base station (for example, base station 100) or another UE.

(2) Hardware Configuration

Next, a hardware configuration example of the UE 200 according to embodiments of the present disclosure will be described with reference to FIG. 5. Referring to FIG. 5, the UE 200 includes an antenna 281, an RF circuit 283, a processor 285, a memory 287, and a storage 289.

The antenna 281 converts signals into radio waves, and emits the radio waves into the air. In addition, the antenna 281 receives radio waves in the air, and converts the radio waves into signals. The antenna 281 may include a transmitting antenna and a receiving antenna, or may be a single antenna for transmission and reception. The antenna 281 may be a directional antenna, and may include a plurality of antenna elements.

The RF circuit 283 performs analog processing on signals that are transmitted and received through the antenna 281. The RF circuit 283 may include a high-frequency filter, an amplifier, a modulator, a lowpass filter, and the like.

The processor 285 performs digital processing on signals that are transmitted and received through the antenna 281 and the RF circuit 283. The digital processing includes processing of the RAN protocol stack. The processor 285 may include a plurality of processors, or may be a single processor. The plurality of processors may include a baseband processor that performs the digital processing and one or more processors that perform other processing.

The memory 287 stores a program executed by the processor 285, parameters related to the program, and data related to the program. The memory 287 may include at least one of a ROM, an EPROM, an EEPROM, a RAM, and a flash memory. All or part of the memory 287 may be included in the processor 285.

The storage 289 stores various information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a System on Chip (SoC) including the processor 285 and the memory 287. The SoC may include the RF circuit 283, and the radio communication unit 210 may also be implemented by this SoC.

Given the hardware configuration described above, the UE 200 may include a memory (that is, memory 287) that stores a program and one or more processors (that is, processor 285) capable of executing the program, and the one or more processors may be configured to execute the program to perform operations of the processing unit 230. The program may be a program for causing the processors to execute the operations of the processing unit 230.

4. First Embodiment

Figure 6:
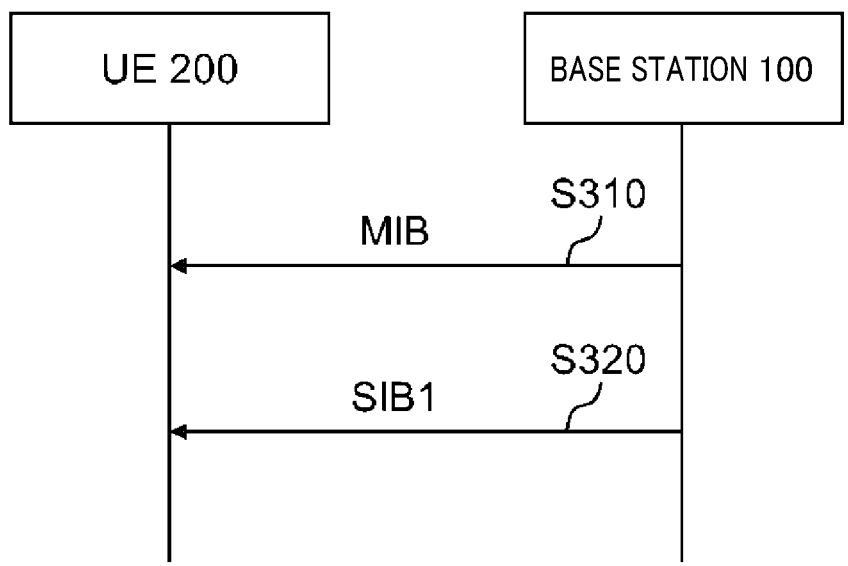
FIG. 6 is a sequence diagram for explaining an example of a schematic flow of processing according to a first embodiment.

A first embodiment of the present disclosure will be described with reference to FIG. 6.

(1) Initial Downlink BWP

Parameter Indicating Location and Bandwidth

The base station 100 (information obtaining unit 141) obtains a System Information Block 1 (SIB1). The base station 100 (communication processing unit 143) transmits the SIB1. In the first embodiment in particular, the SIB1 includes a first parameter indicating a location and a bandwidth of a first initial downlink Bandwidth Part (BWP) and a second parameter indicating a location and a bandwidth of a second initial downlink BWP for a user equipment with a limited bandwidth capability.

The UE 200 (communication processing unit 233) receives the SIB1. The UE 200 (information obtaining unit 231) obtains the first parameter or the second parameter included in the SIB1.

For example, the first parameter is locationAndBandwidth, and indicates a frequency domain location and a bandwidth of the first initial downlink BWP. For example, the second parameter is also locationAndBandwidth, and indicates a frequency domain location and a bandwidth of the second initial downlink BWP.

For example, the bandwidth of the second initial downlink BWP is narrower than the bandwidth of the first initial downlink BWP.

This, for example, enables the UE 200 to use an initial downlink BWP with a bandwidth suitable for the UE 200. More specifically, for example, in a case where the UE 200 is a UE with a limited bandwidth capability, the UE 200 can use an initial downlink BWP for such a UE (that is, the second initial downlink BWP). As an example, in a case where the maximum bandwidth of the UE 200 is 50 RBs, even if the UE 200 is unable to use an initial downlink BWP for a normal UE (for example, 100 RBs), it can use an initial downlink BWP for a UE with a limited bandwidth capability (for example, 40 RBs).

Other Parameters

For example, the SIB1 includes a first parameter set for the first initial downlink BWP, and a second parameter set for the second initial downlink BWP. The first parameter set includes the first parameter, and the second parameter set includes the second parameter.

For example, the UE 200 (information obtaining unit 231) obtains the first parameter set or the second parameter set included in the SIB1.

For example, each of the first parameter set and the second parameter set is generic Parameters.

Subcarrier Spacing

For example, the first parameter set includes a parameter indicating a subcarrier spacing of the first initial downlink BWP, and the second parameter set includes a parameter indicating a subcarrier spacing of the second initial downlink BWP.

This, for example, makes it possible to use different subcarrier spacings for two initial downlink BWPs.

Cyclic Prefix

For example, the first parameter set includes a parameter indicating a cyclic prefix of the first initial downlink BWP, and the second parameter set includes a parameter indicating a cyclic prefix of the second initial downlink BWP. For example, each of these parameters indicates whether to use a normal cyclic prefix or an extended cyclic prefix for the initial downlink BWP.

This, for example, makes it possible to use different cyclic prefixes for two initial downlink BWPs.

(2) Initial Uplink BWP

Parameter Indicating Location And Bandwidth

For example, the SIB1 further includes a third parameter indicating a location and a bandwidth of a first initial uplink BWP and a fourth parameter indicating a location and a bandwidth of a second initial uplink BWP for a user equipment with a limited bandwidth capability.

For example, the UE 200 (information obtaining unit 231) obtains the third parameter or the fourth parameter included in the SIB1.

For example, the third parameter is locationAndBandwidth, and indicates a frequency domain location and a bandwidth of the first initial uplink BWP. For example, the fourth parameter is also locationAndBandwidth, and indicates a frequency domain location and a bandwidth of the second initial uplink BWP.

For example, the bandwidth of the second initial uplink BWP is narrower than the bandwidth of the first initial uplink BWP.

This, for example, enables the UE 200 to use an initial uplink BWP with a bandwidth suitable for the UE 200. More specifically, for example, in a case where the UE 200 is a UE with a limited bandwidth capability, the UE 200 can use an initial uplink BWP for such a UE (that is, the second initial uplink BWP). As an example, in a case where the maximum bandwidth of the UE 200 is 50 RBs, even if the UE 200 is unable to use an initial uplink BWP for a normal UE (for example, 100 RBs), it can use an initial uplink BWP for a UE with a limited bandwidth capability (for example, 40 RBs).

Other Parameters

For example, the SIB1 includes a third parameter set for the first initial uplink BWP, and a fourth parameter set for the second initial uplink BWP. The third parameter set includes the third parameter, and the fourth parameter set includes the fourth parameter.

For example, the UE 200 (information obtaining unit 231) obtains the third parameter set or the fourth parameter set included in the SIB1.

For example, each of the third parameter set and the fourth parameter set is generic Parameters.

Subcarrier Spacing

For example, the third parameter set includes a parameter indicating a subcarrier spacing of the first initial uplink BWP, and the fourth parameter set includes a parameter indicating a subcarrier spacing of the second initial uplink BWP.

This, for example, makes it possible to use different subcarrier spacings for two initial uplink BWPs.

Cyclic Prefix

For example, the third parameter set includes a parameter indicating a cyclic prefix of the first initial uplink BWP, and the fourth parameter set includes a parameter indicating a cyclic prefix of the second initial uplink BWP. For example, each of these parameters indicates whether to use a normal cyclic prefix or an extended cyclic prefix for the initial uplink BWP.

This, for example, makes it possible to use different cyclic prefixes for the two initial uplink BWPs.

(3) UE with Limited Bandwidth Capability

The UE with a limited bandwidth capability has a narrower maximum bandwidth than a normal UE. The limited bandwidth capability may be referred to as a reduced bandwidth capability or a narrow bandwidth capability.

Note that the UE with a limited bandwidth capability may have one or more other limited capabilities and may be simply referred to as a UE with a limited capability (or a reduced capability) or a Reduced Capability (RedCap) UE. For example, the one or more other limited capabilities may include a limited capability for the number of antennas, and the UE with a limited capability may have fewer antennas than a normal UE. The one or more other limited capabilities may include a limited duplex capability, and the UE with a limited capability may be capable of communicating only in half-duplex. The half-duplex may be Frequency Division Duplex (FDD) half-duplex (half-duplex-FDD).

The UE with a limited bandwidth capability may have a relaxed capability. For example, the relaxed capability may include a relaxed processing capability, and the UE with a limited bandwidth capability may have lower processing performance than a normal UE.

(4) Operations Based on Parameters

As described above, the UE 200 (information obtaining unit 231) obtains the first parameter set or the second parameter set included in the SIB1. In addition, as described above, the UE 200 (information obtaining unit 231) obtains the third parameter set or the fourth parameter set included in the SIB1. For example, in a case where the UE 200 is a normal UE, the UE 200 (communication processing unit 233) communicates with the base station 100 using the first initial downlink BWP and the first initial uplink BWP based on the first parameter set and the third parameter set. For example, in a case where the UE 200 is a UE with a limited bandwidth capability, the UE 200 (communication processing unit 233) communicates with the base station 100 using the second initial downlink BWP and the second initial uplink BWP based on the second parameter set and the fourth parameter set.

(4) Allowance/Restriction of Access

The SIB1 may include access information regarding allowance or barring of an access by a UE with a limited bandwidth capability. This, for example, makes it possible to control an access by a UE with a limited bandwidth capability.

As an example, the access information is information indicating that a UE with a limited bandwidth capability is allowed to access a cell. In this case, in a case where the SIB1 includes the access information, the UE 200 (communication processing unit 233) considers that a UE with a limited bandwidth capability can access the cell. Meanwhile, in a case where the SIB1 does not include the access information, the UE 200 (communication processing unit 233) considers that a UE with a limited bandwidth capability is barred from accessing the cell.

As another example, the access information may be information indicating that a UE with a limited bandwidth capability is barred from accessing a cell. In this case, in a case where the SIB1 does not include the access information, the UE 200 (communication processing unit 233) may consider that a UE with a limited bandwidth capability can access the cell. Meanwhile, in a case where the SIB1 includes the access information, the UE 200 (communication processing unit 233) may consider that a UE with a limited bandwidth capability is barred from accessing the cell.

As yet another example, the access information may be information indicating whether a UE with a limited bandwidth capability is allowed to access a cell or barred from accessing the cell. In this case, the UE 200 (communication processing unit 233) may determine, based on the access information, whether a UE with a limited bandwidth capability is allowed to access the cell or barred from accessing the cell.

(5) Process Flow

An example of processing according to the first embodiment will be described with reference to FIG. 6.

The base station 100 obtains a MIB and transmits the MIB (S310). The UE 200 receives the MIB.

The base station 100 obtains a SIB1 and transmits the SIB1 (S320). The SIB1 includes a first parameter set for a first initial downlink BWP, and a second parameter set for a second initial downlink BWP for a UE with a limited bandwidth capability. Further, the SIB1 includes a third parameter set for a first initial uplink BWP, and a fourth parameter set for a second initial uplink BWP for a UE with a limited bandwidth capability.

The UE 200 receives the SIB1. The UE 200 obtains the first parameter set and the third parameter set, or the second parameter set and the fourth parameter set.

(6) Modification Examples

In the above-described example of the first embodiment, the SIB1 includes the first parameter set, the second parameter set, the third parameter set, and the fourth parameter set. However, the first embodiment is not limited to this example.

As a modification example of the first embodiment, the SIB1 includes a parameter set for an initial downlink BWP (for example, genericParameters), and the parameter set may include both of the first parameter and the second parameter. Further, the parameter set may include other parameters common to the first initial downlink BWP and the second initial downlink BWP. Such other parameters may include a parameter indicating a subcarrier spacing and a parameter indicating a cyclic prefix.

In addition, the SIB1 includes a parameter set for an initial uplink BWP (for example, genericParameters), and the parameter set may include both of the third parameter and the fourth parameter. Further, the parameter set may include other parameters common to the first initial uplink BWP and the second initial uplink BWP. Such other parameters may include a parameter indicating a subcarrier spacing and a parameter indicating a cyclic prefix.

This can suppress, for example, an increase in the amount of information in SIB1.

5. Second Embodiment

Figure 7:
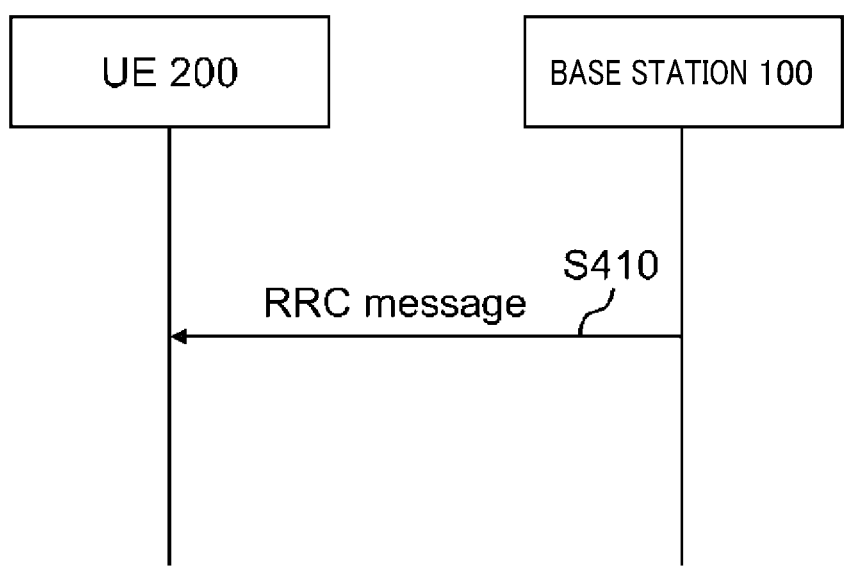
FIG. 7 is a sequence diagram for explaining an example of a schematic flow of processing according to a second embodiment.

A second embodiment of the present disclosure will be described with reference to FIG. 7.
(1) Initial Downlink BWP
Identification Information In the second embodiment in particular, the base station 100 (information obtaining unit 141) obtains an RRC message that includes identification information for identifying an initial downlink BWP for a UE with a limited bandwidth capability. The base station 100 (communication processing unit 143) transmits the RRC message to the UE 200. For example, the identification information is a BWP ID.

The UE 200 (communication processing unit 233) receives the RRC message from the base station. The UE 200 (information obtaining unit 231) obtains the identification information included in the RRC message.

This, for example, enables the UE 200 to use an initial downlink BWP with a bandwidth suitable for the UE 200. More specifically, for example, in a case where the UE 200 is a UE with a limited bandwidth capability, the UE 200 can use an initial downlink BWP for such a UE. As an example, in a case where the maximum bandwidth of the UE 200 is 50 RBs, even if the UE 200 is unable to use an initial downlink BWP for a normal UE (for example, 100 RBs), it can use an initial downlink BWP for a UE with a limited bandwidth capability (for example, 40 RBs).

Configuration Information

For example, the RRC message further includes configuration information for configuring a plurality of downlink BWPs, and the initial downlink BWP is one downlink BWP of the plurality of downlink BWPs. The identification information is the same as identification information of the one downlink BWP.

For example, the configuration information is downlinkBWP-ToAddModList and includes a plurality of BWP-Downlink. Each BWP-Downlink includes BWP-ID, genericParameters, and the like. The identification information for identifying the initial downlink BWP for a UE with a limited bandwidth capability (for example, redCap-InitialDownlinkBWP-Id-r17), which is a BWP ID, is an information element independent of downlinkBWP-ToAddModList. The identification information is the same as BWP-ID of one BWP-Downlink included in downlinkBWP-ToAddModList.

This, for example, makes it possible to use one of a plurality of configured downlink BWPs as the initial downlink BWP. Therefore, it is not necessary to add new information other than the identification information, and overhead can be reduced.

(2) Initial Uplink BWP

Identification Information

For example, the RRC message further includes further identification information for identifying an initial uplink BWP for a UE with a limited bandwidth capability. For example, the further identification information is also a BWP ID.

For example, the UE 200 (information obtaining unit 231) obtains the further identification information included in the RRC message.

This, for example, enables the UE 200 to use an initial uplink BWP with a bandwidth suitable for the UE 200. More specifically, for example, in a case where the UE 200 is a UE with a limited bandwidth capability, the UE 200 can use an initial uplink BWP for such a UE. As an example, in a case where the maximum bandwidth of the UE 200 is 50 RBs, even if the UE 200 is unable to use an initial uplink BWP for a normal UE (for example, 100 RBs), it can use an initial uplink BWP for a UE with a limited bandwidth capability (for example, 40 RBs).

Configuration Information

For example, the RRC message further includes configuration information for configuring a plurality of uplink BWPs, and the initial uplink BWP is one uplink BWP of the plurality of uplink BWPs. The further identification information is the same as identification information of the one uplink BWP.

For example, the configuration information is uplinkBWP-ToAddModList and includes a plurality of BWP-Uplink. Each BWP-Uplink includes BWP-ID, genericParameters, and the like. The further identification information for identifying the initial uplink BWP for a UE with a limited bandwidth capability (for example, redCap-InitialUplinkBWP-Id-r17), which is a BWP ID, is an information element independent of uplinkBWP-ToAddModList. The further identification information is the same as BWP-ID of one BWP-Uplink included in uplinkBWP-ToAddModList.

This, for example, makes it possible to use one of a plurality of configured uplink BWPs as the initial uplink BWP. Therefore, it is not necessary to add new information other than the further identification information, and overhead can be reduced.

(3) UE with Limited Bandwidth Capability

Description for the UE with a limited bandwidth capability is the same as the description in the first embodiment. Thus, duplicate description is omitted here.

(4) RRC Message

For example, the RRC message is an RRC Setup message, an RRC Resume message, or an RRC Reconfiguration message. For example, the RRC Reconfiguration message is transmitted after establishment or setup of an RRC connection.

This, for example, makes it possible to promptly use an initial BWP without change in a SIB1.

Note that, for example, the identification information and the further identification information are included in ServingCellConfig in the RRC message.

(5) SIB1

For example, the base station 100 (information obtaining unit 141) obtains a SIB1. The base station 100 (communication processing unit 143) transmits the SIB1.

Initial BWP for Normal UE

In particular, the SIB1 includes information regarding a further initial downlink BWP different from the initial downlink BWP for a UE with a limited bandwidth capability. The further initial downlink BWP is an initial downlink BWP for a normal UE. For example, the bandwidth of the initial downlink BWP for a UE with a limited bandwidth capability is narrower than that of the further initial downlink BWP for a normal UE. For example, the BWP ID of the further initial downlink BWP for a normal UE is 0, and the BWP ID of the initial downlink BWP for a UE with a limited bandwidth capability is other than 0.

In addition, the SIB1 includes information regarding a further initial uplink BWP different from the initial uplink BWP for a UE with a limited bandwidth capability. The further initial uplink BWP is an initial uplink BWP for a normal UE. For example, the bandwidth of the initial uplink BWP for a UE with a limited bandwidth capability is narrower than that of the further initial uplink BWP for a normal UE. For example, the BWP ID of the further initial uplink BWP for a normal UE is 0, and the BWP ID of the initial uplink BWP for a UE with a limited bandwidth capability is other than 0.

Provisional Use

Downlink

For example, in a case where the UE 200 is a UE with a limited bandwidth capability, the base station 100 (communication processing unit 143) performs transmission to the UE 200 using the initial downlink BWP for a UE with a limited bandwidth capability. In addition, the UE 200 (communication processing unit 233) performs reception from the base station 100 using the initial downlink BWP for a UE with a limited bandwidth capability.

However, the base station 100 (communication processing unit 143) performs transmission to the UE 200 using the further initial downlink BWP for a normal UE before transmitting the RRC message to the UE 200. The UE 200 (communication processing unit 233) also performs reception from the base station 100 using the further initial downlink BWP for a normal UE before receiving the RRC message from the base station 100.

This allows, for example, transmission from the base station 100 to the UE 200 even before the RRC message is transmitted.

Uplink

For example, in a case where the UE 200 is a UE with a limited bandwidth capability, the base station 100 (communication processing unit 143) performs reception from the UE 200 using the initial uplink BWP for a UE with a limited bandwidth capability. In addition, the UE 200 (communication processing unit 233) performs transmission to the base station 100 using the initial uplink BWP for a UE with a limited bandwidth capability.

However, the base station 100 (communication processing unit 143) performs reception from the UE 200 using the further initial uplink BWP for a normal UE before transmitting the RRC message to the UE 200. The UE 200 (communication processing unit 233) also performs transmission to the base station 100 using the further initial uplink BWP for a normal UE before receiving the RRC message from the base station 100.

This allows, for example, transmission from the UE 200 to the base station 100 even before the RRC message is transmitted.

(6) Process Flow

An example of processing according to the second embodiment will be described with reference to FIG. 7.

The base station 100 obtains an RRC message and transmits the RRC message (S410). The RRC message includes identification information for identifying an initial downlink BWP for a UE with a limited bandwidth capability. Further, the RRC message also includes further identification information for identifying an initial uplink BWP for a UE with a limited bandwidth capability.

The UE 200 receives the RRC message. The UE 200 obtains the identification information for identifying the initial downlink BWP and the further identification information for identifying the initial uplink BWP.

6. Modification Examples

In the above-described examples of embodiments of the present disclosure, the system 1 is a system compliant with 5G or NR TSs. However, the system 1 according to embodiments of the present disclosure is not limited to this example.

The system 1 may be a system compliant with other 3GPP TSs. As an example, the system 1 may be a system compliant with TSs of Long Term Evolution (LTE), LTE Advanced (LTE-A), or 4G, and the base station 100 may be an evolved Node B (eNB). As another example, the system 1 may be a system compliant with TSs of 3G, and the base station 100 may be a Node B. As yet another example, the system 1 may be a system compliant with TSs of next-generation (for example, 6G).

Alternatively, the system 1 may be a system compliant with TS s of another standardization organization for mobile communications.

While embodiments of the present disclosure have been described above, the present disclosure is not limited to the embodiments. It will be understood by those skilled in the art that the embodiments are merely examples and various changes can be made without departing from the scope and the spirit of the present disclosure.

For example, steps in a process described in the present specification are not necessarily executed chronologically in the order described in the flowchart or sequence diagram. For example, steps in a process may be executed in an order different from the order described as the flowchart or sequence diagram, or may be executed in parallel. In addition, one or more steps in a process may be removed, or one or more further steps may be added to the process.

For example, there may be provided a method including the operations of one or more components of an apparatus described in the present specification, and there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to as another name such as mobile station, mobile terminal, mobile device, mobile unit, subscriber station, subscriber terminal, subscriber device, subscriber unit, wireless station, wireless terminal, wireless device, wireless unit, remote station, remote terminal, remote device, or remote unit.

For example, in the present disclosure, "transmit" may mean to perform processing of at least one layer in a protocol stack used for transmission, or to physically transmit signals wirelessly or by wire. Alternatively, "transmit" may mean a combination of performing processing of the at least one layer and physically transmitting signals wirelessly or by wire. Similarly, "receive" may mean to perform processing of at least one layer in a protocol stack used for reception, or to physically receive signals wirelessly or by wire. Alternatively, "receive" may mean a combination of performing processing of the at least one layer and physically receiving signals wirelessly or by wire.

For example, in the present disclosure, "obtain/acquire" may mean to obtain/acquire information from stored information, to obtain/acquire information from information received from another node, or to obtain/acquire information by generating the information.

For example, in the present disclosure, "include" and "comprise" do not mean that only listed items are included but mean that only listed items may be included or a further item as well as the listed items may be included.

For example, in the present disclosure, "or" does not mean exclusive OR but means inclusive OR.

Note that the technical features included in the above embodiments may be represented as the following features. Naturally, the present disclosure is not limited to the following features.

Feature 1

A base station (100) comprising:
an information obtaining unit (141) configured to obtain a System Information Block 1, SIB1; and
a communication processing unit (143) configured to transmit the SIB1,
wherein the SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

Feature 2

The base station according to Feature 1, wherein
the SIB1 includes a first parameter set for the first initial downlink BWP and a second parameter set for the second initial downlink BWP,
the first parameter set includes the first parameter, a parameter indicating a subcarrier spacing of the first initial downlink BWP, and a parameter indicating a cyclic prefix of the first initial downlink BWP, and
the second parameter set includes the second parameter, a parameter indicating a subcarrier spacing of the second initial downlink BWP, and a parameter indicating a cyclic prefix of the second initial downlink BWP.

Feature 3

The base station according to Feature 1 or 2, wherein the SIB1 further includes a third parameter indicating a location and a bandwidth of a first initial uplink BWP and a fourth parameter indicating a location and a bandwidth of a second initial uplink BWP for a user equipment with a limited bandwidth capability.

Feature 4

The base station according to Feature 3, wherein
the SIB1 includes a third parameter set for the first initial uplink BWP and a fourth parameter set for the second initial uplink BWP,
the third parameter set includes the third parameter, a parameter indicating a subcarrier spacing of the first initial uplink BWP, and a parameter indicating a cyclic prefix of the first initial uplink BWP, and
the fourth parameter set includes the fourth parameter, a parameter indicating a subcarrier spacing of the second initial uplink BWP, and a parameter indicating a cyclic prefix of the second initial uplink BWP.

Feature 5

The base station according to any one of Features 1 to 4, wherein the SIB1 includes access information regarding allowance or restriction of an access by a user equipment with a limited bandwidth capability.

Feature 6

A user equipment (200) comprising:
a communication processing unit (233) configured to receive a System Information Block 1, SIB1, that includes a first parameter indicating a location and a bandwidth of a first initial downlink Bandwidth Part, BWP, and a second parameter indicating a location and a bandwidth of a second initial downlink BWP for a user equipment with a limited bandwidth capability; and
an information obtaining unit (231) configured to obtain the first parameter or the second parameter included in the SIB1.

Feature 7

A base station (100) comprising:
an information obtaining unit (141) configured to obtain a Radio Resource Control, RRC, message that includes identification information for identifying an initial downlink Bandwidth Part, BWP, for a user equipment with a limited bandwidth capability; and
a communication processing unit (143) configured to transmit the RRC message to a user equipment (200).

Feature 8

The base station according to Feature 7, wherein the RRC message is an RRC Setup message, an RRC Resume message, or an RRC Reconfiguration message.

Feature 9

The base station according to Feature 7 or 8, wherein
the RRC message further includes configuration information for configuring a plurality of downlink BWPs,
the initial downlink BWP is one downlink BWP of the plurality of downlink BWPs, and
the identification information is the same as identification information of the one downlink BWP.

Feature 10

The base station according to any one of Features 7 to 9, wherein
the information obtaining unit is configured to obtain a System Information Block 1, SIB1, that includes information regarding a further initial downlink BWP different from the initial downlink BWP,
the communication processing unit is configured to transmit the SIB1, and
the communication processing unit is configured to perform transmission to the user equipment using the further initial downlink BWP before transmitting the RRC message to the user equipment.

Feature 11

The base station according to any one of Features 7 to 10, wherein the RRC message further includes further identification information for identifying an initial uplink BWP for a user equipment with a limited bandwidth capability.

Feature 12

The base station according to Feature 11, wherein
the RRC message further includes configuration information for configuring a plurality of uplink BWPs,
the initial uplink BWP is one uplink BWP of the plurality of uplink BWPs, and
the further identification information is the same as identification information of the one uplink BWP.

Feature 13

The base station according to Feature 11 or 12, wherein
the information obtaining unit is configured to obtain a System Information Block 1, SIB1, that includes information regarding a further initial uplink BWP different from the initial uplink BWP,
the communication processing unit is configured to transmit the SIB1, and
the communication processing unit is configured to perform reception from the user equipment using the further initial uplink BWP before transmitting the RRC message to the user equipment.

Feature 14

A user equipment (200) comprising:
a communication processing unit (233) configured to receive, from a base station (100), a Radio Resource Control, RRC, message that includes identification information for identifying an initial downlink Bandwidth Part, BWP, for a user equipment with a limited bandwidth capability; and
an information obtaining unit (231) configured to obtain the identification information included in the RRC message.

Feature 15

A method performed by a base station (100), comprising:
obtaining a System Information Block 1, SIB1; and
transmitting the SIB1,
wherein the SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

Feature 16

A method performed by a user equipment (200), comprising:
receiving a System Information Block 1, SIB1, that includes a first parameter indicating a location and a bandwidth of a first initial downlink Bandwidth Part, BWP, and a second parameter indicating a location and a bandwidth of a second initial downlink BWP for a user equipment with a limited bandwidth capability; and
obtaining the first parameter or the second parameter included in the SIB1.

Feature 17

A method performed by a base station (100), comprising:
obtaining a Radio Resource Control, RRC, message that includes identification information for identifying an initial downlink Bandwidth Part, BWP, for a user equipment with a limited bandwidth capability; and
transmitting the RRC message to a user equipment (200).

Feature 18

A method performed by a user equipment (200), comprising:
receiving, from a base station (100), a Radio Resource Control, RRC, message that includes identification information for identifying an initial downlink Bandwidth Part, BWP, for a user equipment with a limited bandwidth capability; and
obtaining the identification information included in the RRC message.

Feature 19

A program for causing a computer to execute:
obtaining a System Information Block 1, SIB1; and
transmitting the SIB1,
wherein the SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

Feature 20

A program for causing a computer to execute:
receiving a System Information Block 1, SIB1, that includes a first parameter indicating a location and a bandwidth of a first initial downlink Bandwidth Part, BWP, and a second parameter indicating a location and a bandwidth of a second initial downlink BWP for a user equipment with a limited bandwidth capability; and
obtaining the first parameter or the second parameter included in the SIB1.

Feature 21

A program for causing a computer to execute:
obtaining a Radio Resource Control, RRC, message that includes identification information for identifying an initial downlink Bandwidth Part, BWP, for a user equipment with a limited bandwidth capability; and
transmitting the RRC message to a user equipment (200).

Feature 22

A program for causing a computer to execute:
receiving, from a base station (100), a Radio Resource Control, RRC, message that includes identification information for identifying an initial downlink Bandwidth Part, BWP, for a user equipment with a limited bandwidth capability; and
obtaining the identification information included in the RRC message.

Feature 23

A non-transitory tangible computer-readable storage medium having stored therein a program for causing a computer to execute:
obtaining a System Information Block 1, SIB1; and
transmitting the SIB1,
wherein the SIB1 includes a first parameter indicating a location and a bandwidth of a first initial downlink Bandwidth Part, BWP, and a second parameter indicating a location and a bandwidth of a second initial downlink BWP for a user equipment with a limited bandwidth capability.

Feature 24

A non-transitory tangible computer-readable storage medium having stored therein a program for causing a computer to execute:
receiving a System Information Block 1, SIB1, that includes a first parameter indicating a location and a bandwidth of a first initial downlink Bandwidth Part, BWP, and a second parameter indicating a location and a bandwidth of a second initial downlink BWP for a user equipment with a limited bandwidth capability; and
obtaining the first parameter or the second parameter included in the SIB1.

Feature 25

A non-transitory tangible computer-readable storage medium having stored therein a program for causing a computer to execute:
obtaining a Radio Resource Control, RRC, message that includes identification information for identifying an initial downlink Bandwidth Part, BWP, for a user equipment with a limited bandwidth capability; and
transmitting the RRC message to a user equipment (200).

Feature 26

A non-transitory tangible computer-readable storage medium having stored therein a program for causing a computer to execute:
receiving, from a base station (100), a Radio Resource Control, RRC, message that includes identification information for identifying an initial downlink Bandwidth Part, BWP, for a user equipment with a limited bandwidth capability; and
obtaining the identification information included in the RRC message.

What is claimed is:

1. A user equipment comprising:
a memory storing a program; and
one or more processors configured to execute the program to:
receive a System Information Block 1, SIB1, that includes a first parameter set for a first initial downlink Bandwidth Part, BWP, a second parameter set for a second initial downlink BWP for a Reduced Capability user equipment, a third parameter set for a first initial uplink BWP, and a fourth parameter set for a second initial uplink BWP for the Reduced Capability user equipment,
use the second initial downlink BWP based on the second parameter set included in the SIB1, and
use the second initial uplink BWP based on the fourth parameter set included in the SIB1,
wherein
the first parameter set includes a parameter indicating a location and a bandwidth of the first initial downlink BWP, and a parameter indicating a subcarrier spacing of the first initial downlink BWP,
the second parameter set includes a parameter indicating a location and a bandwidth of the second initial downlink BWP, and a parameter indicating a subcarrier spacing of the second initial downlink BWP,
the third parameter set includes a parameter indicating a location and a bandwidth of the first initial uplink BWP, and a parameter indicating a subcarrier spacing of the first initial uplink BWP, and
the fourth parameter set includes a parameter indicating a location and a bandwidth of the second initial uplink BWP, and a parameter indicating a subcarrier spacing of the second initial uplink BWP.

2. The user equipment according to claim 1, wherein
the first parameter set includes a parameter indicating a cyclic prefix of the first initial downlink BWP, and
the second parameter set includes a parameter indicating a cyclic prefix of the second initial downlink BWP.

3. The user equipment according to claim 1, wherein
the third parameter set includes a parameter indicating a cyclic prefix of the first initial uplink BWP, and
the fourth parameter set includes a parameter indicating a cyclic prefix of the second initial uplink BWP.

4. The user equipment according to claim 1, wherein
the SIB1 includes information for indicating that the Reduced Capability user equipment is allowed to access a cell in a case where the Reduced Capability user equipment is allowed to access the cell, and
the SIB1 does not include the information for indicating that the Reduced Capability user equipment is allowed to access a cell in a case where the Reduced Capability user equipment is not allowed to access the cell.

5. A base station comprising:
a memory storing a program; and
one or more processors configured to execute the program to:
generate a System Information Block 1, SIB1; and
transmit the SIB1,
wherein
the SIB1 includes a first parameter set for a first initial downlink Bandwidth Part, BWP, a second parameter set for a second initial downlink BWP for a Reduced Capability user equipment, a third parameter set for a first initial uplink BWP, and a fourth parameter set for a second initial uplink BWP for the Reduced Capability user equipment,
the first parameter set includes a parameter indicating a location and a bandwidth of the first initial downlink BWP, and a parameter indicating a subcarrier spacing of the first initial downlink BWP,
the second parameter set includes a parameter indicating a location and a bandwidth of the second initial downlink BWP, and a parameter indicating a subcarrier spacing of the second initial downlink BWP,
the third parameter set includes a parameter indicating a location and a bandwidth of the first initial uplink BWP, and a parameter indicating a subcarrier spacing of the first initial uplink BWP, and
the fourth parameter set includes a parameter indicating a location and a bandwidth of the second initial uplink BWP, and a parameter indicating a subcarrier spacing of the second initial uplink BWP.

6. The base station according to claim 5, wherein
the first parameter set includes a parameter indicating a cyclic prefix of the first initial downlink BWP, and
the second parameter set includes a parameter indicating a cyclic prefix of the second initial downlink BWP.

7. The base station according to claim 5, wherein
the third parameter set includes a parameter indicating a cyclic prefix of the first initial uplink BWP, and
the fourth parameter set includes a parameter indicating a cyclic prefix of the second initial uplink BWP.

8. The base station according to claim 5, wherein
the SIB1 includes information for indicating that the Reduced Capability user equipment is allowed to access a cell in a case where the Reduced Capability user equipment is allowed to access the cell, and
the SIB1 does not include the information for indicating that the Reduced Capability user equipment is allowed to access a cell in a case where the Reduced Capability user equipment is not allowed to access the cell.

9. A method performed by a user equipment comprising:
receiving a System Information Block 1, SIB1, that includes a first parameter set for a first initial downlink Bandwidth Part, BWP, a second parameter set for a second initial downlink BWP for a Reduced Capability user equipment, a third parameter set for a first initial uplink BWP, and a fourth parameter set for a second initial uplink BWP for the Reduced Capability user equipment;

using the second initial downlink BWP based on the second parameter set included in the SIB1; and
using the second initial uplink BWP based on the fourth parameter set included in the SIB1;
wherein:
the first parameter set includes a parameter indicating a location and a bandwidth of the first initial downlink BWP, and a parameter indicating a subcarrier spacing of the first initial downlink BWP,
the second parameter set includes a parameter indicating a location and a bandwidth of the second initial downlink BWP, and a parameter indicating a subcarrier spacing of the second initial downlink BWP,
the third parameter set includes a parameter indicating a location and a bandwidth of the first initial uplink BWP, and a parameter indicating a subcarrier spacing of the first initial uplink BWP, and
the fourth parameter set includes a parameter indicating a location and a bandwidth of the second initial uplink BWP, and a parameter indicating a subcarrier spacing of the second initial uplink BWP.

10. The method according to claim 9, wherein
the SIB1 includes information for indicating that the Reduced Capability user equipment is allowed to access a cell in a case where the Reduced Capability user equipment is allowed to access the cell, and
the SIB1 does not include the information for indicating that the Reduced Capability user equipment is allowed to access a cell in a case where the Reduced Capability user equipment is not allowed to access the cell.

11. The method according to claim 9, wherein
the first parameter set includes a parameter indicating a cyclic prefix of the first initial downlink BWP, and
the second parameter set includes a parameter indicating a cyclic prefix of the second initial downlink BWP.

12. The method according to claim 9, wherein
the third parameter set includes a parameter indicating a cyclic prefix of the first initial uplink BWP, and
the fourth parameter set includes a parameter indicating a cyclic prefix of the second initial uplink BWP.

* * * * *